(12) United States Patent
Foote (10) Patent No.: US 9,004,494 B2
(45) Date of Patent: Apr. 14, 2015

(54) ROTARY SEAL FOR DYNAMICALLY SEALING AGAINST A SURFACE OF A SHAFT

(76) Inventor: Dean Foote, Edmonton (CA)

(*) Notice: Subject to any disclaimer, the term of this patent is extended or adjusted under 35 U.S.C. 154(b) by 438 days.

(21) Appl. No.: 11/697,001

(22) Filed: Apr. 5, 2007

(65) Prior Publication Data

US 2007/0246894 A1 Oct. 25, 2007

Related U.S. Application Data

(60) Provisional application No. 60/789,318, filed on Apr. 5, 2006.

(51) Int. Cl.
*F16J 15/32* (2006.01)

(52) U.S. Cl.
CPC ............ *F16J 15/324* (2013.01); *F16J 15/3244* (2013.01)

(58) Field of Classification Search
CPC ....... F16J 15/32; F16J 15/3204; F16J 15/324; F16J 15/3244
USPC ........................ 277/500, 563, 559, 553, 549
See application file for complete search history.

(56) References Cited

U.S. PATENT DOCUMENTS

| 3,729,204 | A | * | 4/1973 | Augustin ...................... 277/559 |
| 4,118,856 | A | * | 10/1978 | Bainard et al. .................. 29/511 |
| 4,399,998 | A | * | 8/1983 | Otto .............................. 277/552 |
| 4,568,092 | A | * | 2/1986 | Hayashida et al. ........... 277/559 |
| 5,667,225 | A | * | 9/1997 | Vollmer et al. ................ 277/563 |
| 5,873,576 | A | * | 2/1999 | Dietle et al. .................. 277/559 |
| 6,203,024 | B1 | * | 3/2001 | Liebich et al. ................ 277/634 |
| 6,863,661 | B2 | * | 3/2005 | Carrillo et al. ........... 604/167.01 |
| 7,052,020 | B2 | | 5/2006 | Gobeli et al. |
| 2004/0004326 | A1 | * | 1/2004 | Lou ............................... 277/394 |

FOREIGN PATENT DOCUMENTS

WO  WO-00/65257  11/2000

* cited by examiner

*Primary Examiner* — Gilbert Lee
(74) *Attorney, Agent, or Firm* — Davis & Bujold, P.L.L.C.; Michael J. Bujold (57) ABSTRACT

A rotary seal for dynamically sealing against a surface of a shaft includes a seal body having a sealing surface and an outer surface. The sealing surface has a first side edge and a second side edge. The sealing surface has discrete fluid pockets positioned between the first side edge and the second side edge. The discrete fluid pockets trap and use clean lubricating fluid to provide a hydrodynamic film between the seal surface and rotating shaft.

11 Claims, 8 Drawing Sheets

ROTARY SEAL FOR DYNAMICALLY SEALING AGAINST A SURFACE OF A SHAFT

FIELD

The present application relates to a rotary seal for dynamically sealing against a surface of a shaft.

BACKGROUND

U.S. Pat. No. 7,052,020 (Kalsi), entitled "Hydrodynamic rotary seal" describes a rotary seal that has a sloping dynamic sealing surface that varies in width.

SUMMARY

There is provided a rotary seal for dynamically sealing against a surface of a shaft, which includes a seal body having a sealing surface and an outer surface. The sealing surface has a first side edge and a second side edge. The sealing surface has discrete fluid pockets positioned between the first side edge and the second side edge. The discrete fluid pockets trap and use clean lubricating fluid to provide a hydrodynamic film between the seal surface and rotating shaft.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A rotary seal for dynamically sealing against a surface of a shaft generally identified by reference numeral 10, will now be described with reference to FIG. 1 through 14.

Figure 1:
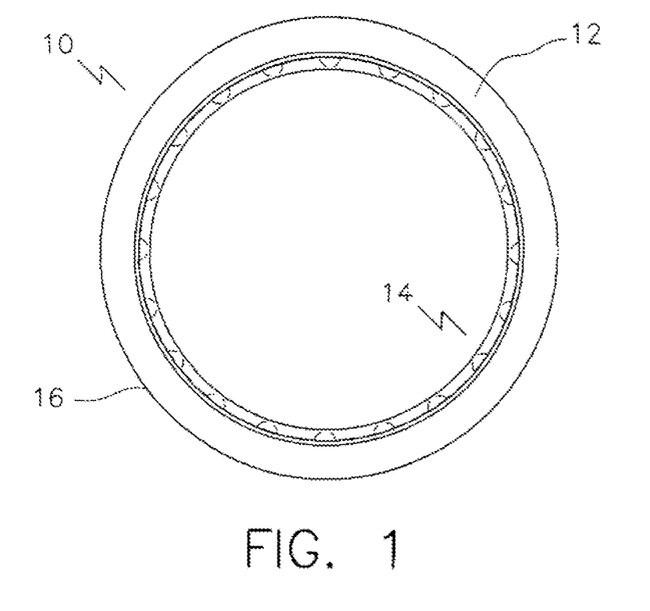
FIG. 1 is a front plan view of a rotary seal.
Figure 11:
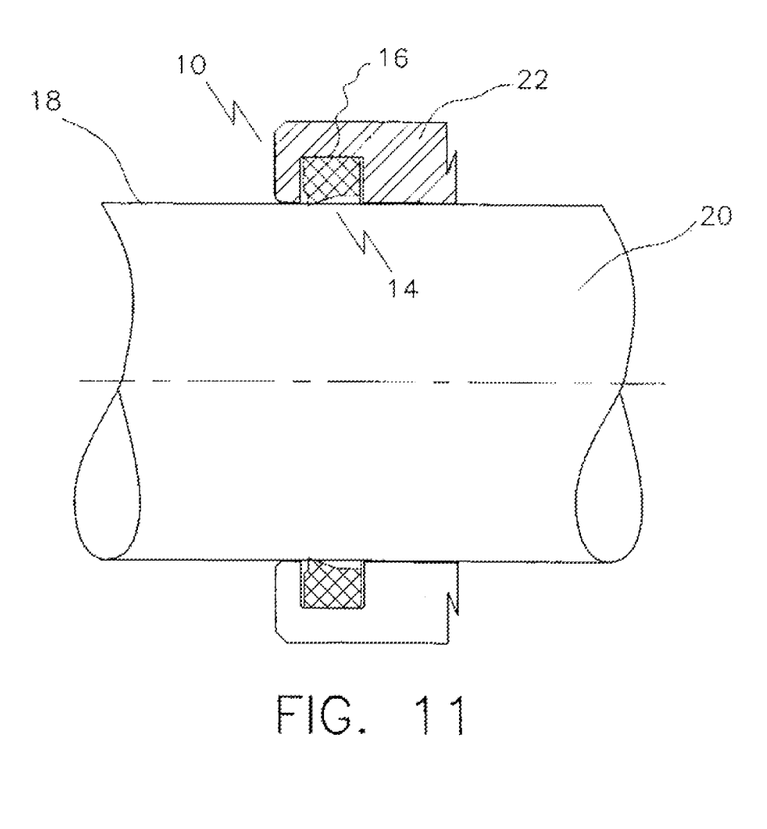
FIG. 11 is a side view in section of a rotary seal installed in a seal housing.

Structure and Relationship of Parts:

Referring to FIG. 1, rotary seal 10 includes a seal body 12 having a sealing surface 14 and an outer surface 16. In the description below, the seal body 12 is described as being formed of an elastomer. However, any suitable material or combination of materials known by those skilled in the art may also be used. Referring to FIG. 11, sealing surface 14 is adapted to engage the surface 18 of a shaft 20, such that shaft 20 is permitted to rotate relative to seal body 12. Outer surface 16 is adapted to engage a housing 22. While the description below describes the shaft as the body that rotates, it will be understood that the shaft rotation is relative to the seal and housing. Thus, the shaft could be stationary with the seal and housing in rotation. It will also be understood that the seal could be mounted in the shaft, rather than the housing as described herein. Furthermore, the term "shaft" is intended to describe any substantially cylindrical body that may be sealed by seal 10 in the manner described herein.

Figure 2:
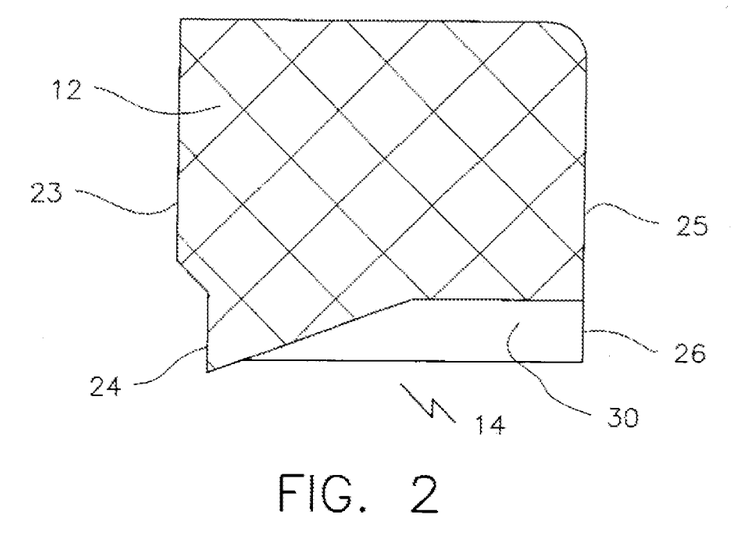
FIG. 2 is a cross-sectional view of the rotary seal.
Figure 3:
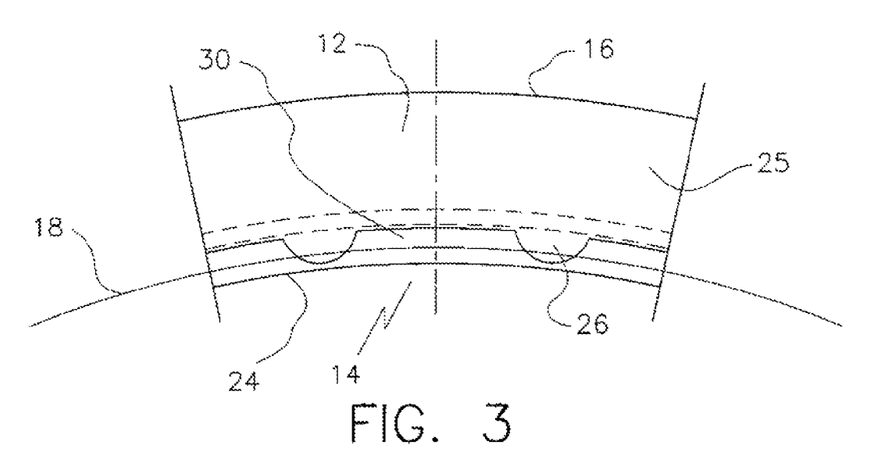
FIG. 3 is a detailed rear plan view of the rotary seal engaging a shaft.
Figure 4:
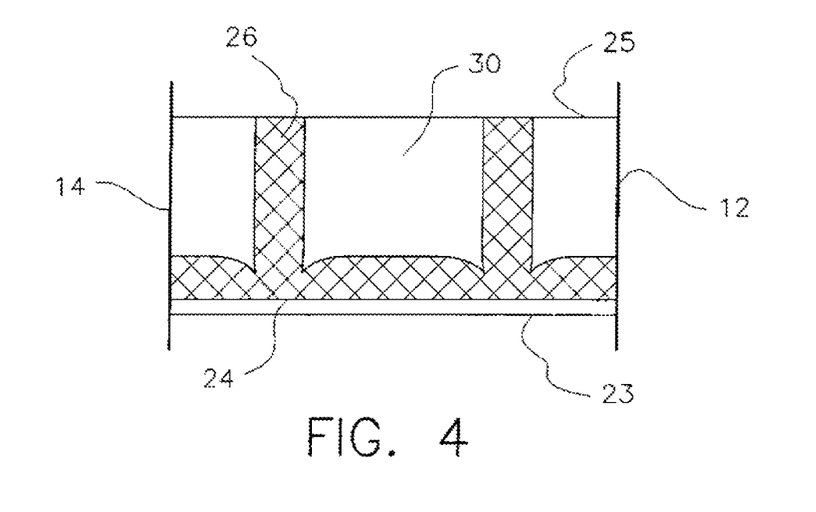
FIG. 4 is a detailed view of the contact surface of the rotary seal as it engages the shaft surface.

Referring to FIG. 2, sealing surface 14 has a sealing lip 24 positioned toward a first side edge 23 of sealing surface 14. Support ribs 26 extend from sealing lip 24 toward a second side edge 25 of sealing surface 14. Support ribs 26 are designed to engage surface 18 of shaft 20. Referring to FIGS. 3 and 4, support ribs 26 form discrete fluid openings 30 for receiving a second fluid, such as a lubricant. Referring to FIG. 2, sealing lip 24 is designed to be equal to or extend below support ribs 26 such that it forms a seal when rotary seal 10 is installed on the surface of the shaft (as shown in FIG. 11). Sealing lip 24 seals against a first fluid, such as an abrasive hydrocarbon flow in an oilfield application.

Figure 5:
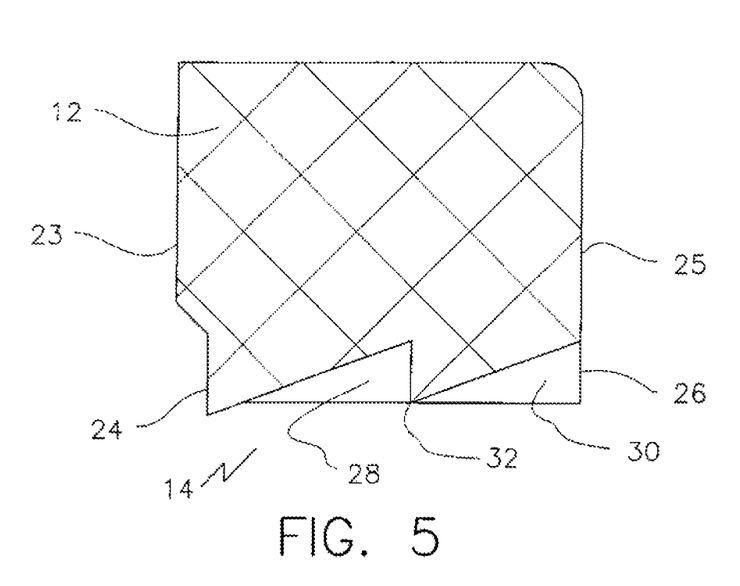
FIG. 5 is a cross-sectional view of an alternative rotary seal.
Figure 6:
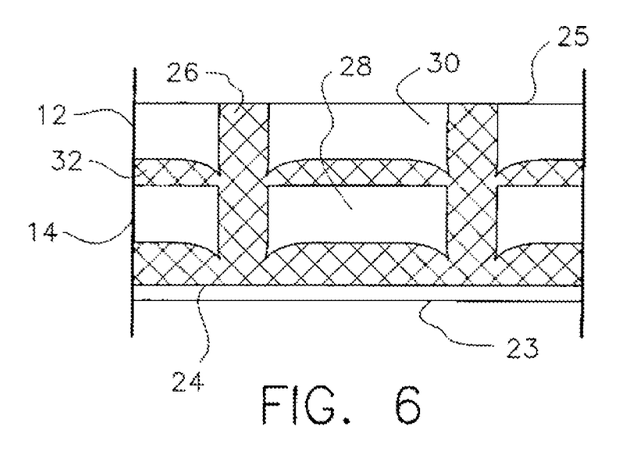
FIG. 6 is a detailed view of the contact surface of the alternative rotary seal as it engages the shaft surface.
Figure 7:
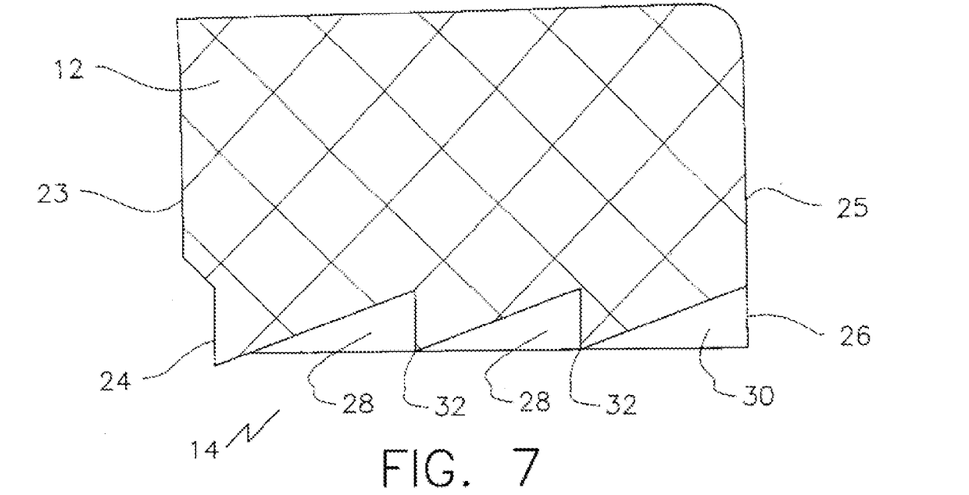
FIG. 7 is a cross-sectional view of a further alternative rotary seal.
Figure 8:
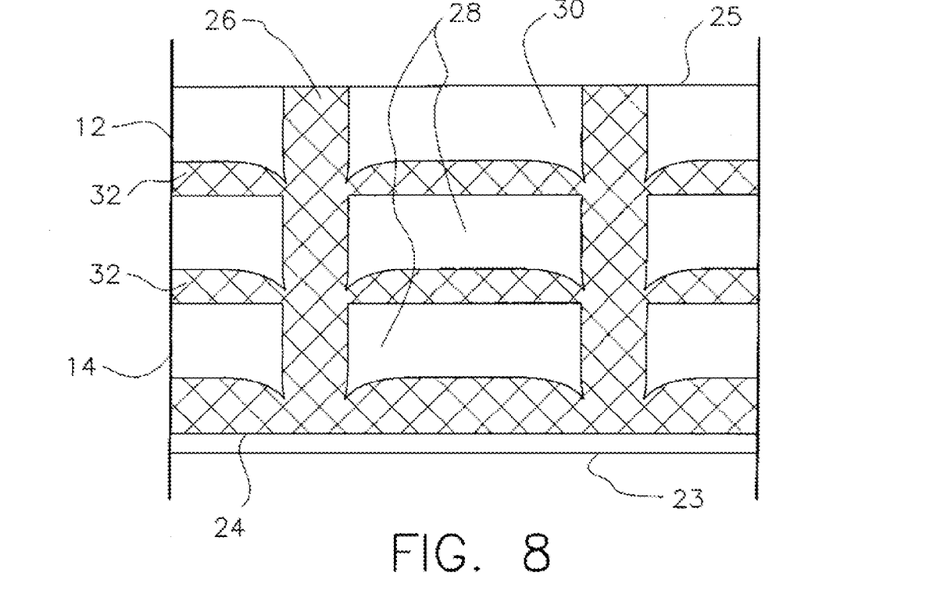
FIG. 8 is a detailed view of the contact surface of the further alternative rotary seal as it engages the shaft surface.

Referring to FIGS. 5 and 7, there may be secondary, or additional sealing lips 32 spaced between sealing lip 24 and second side edge 25 of sealing surface 14. Referring to FIGS. 6 and 8, sealing lip 24, secondary sealing lips 32 and support ribs 26 form discrete fluid pockets 28. While three sealing lips 24 and 32 are shown in FIG. 7, it will be understood that even more secondary sealing lips 32 may be included to form additional rows of pockets 28. The number of rows may be increased in order to accommodate increased magnitudes of pressure (described below), with the limitation being the practical length of the seal.

Figure 9:
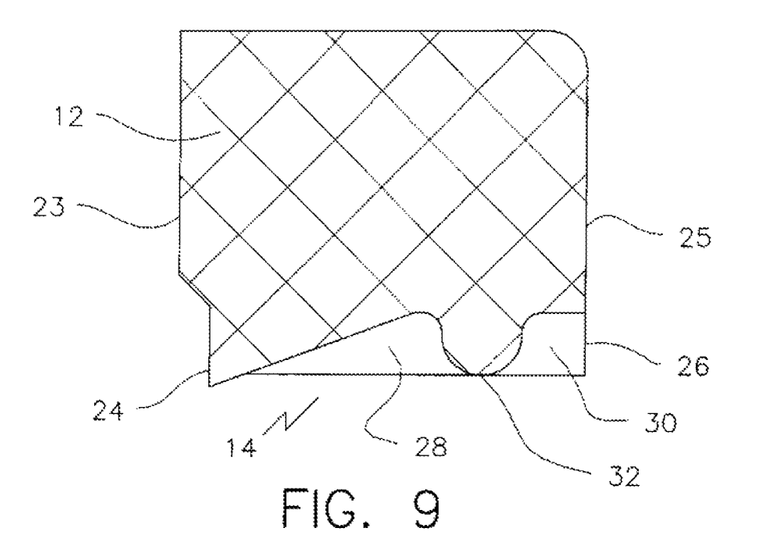
FIGS. 9 and 10 are cross-sectional views of further alternative rotary seals.
Figure 10:
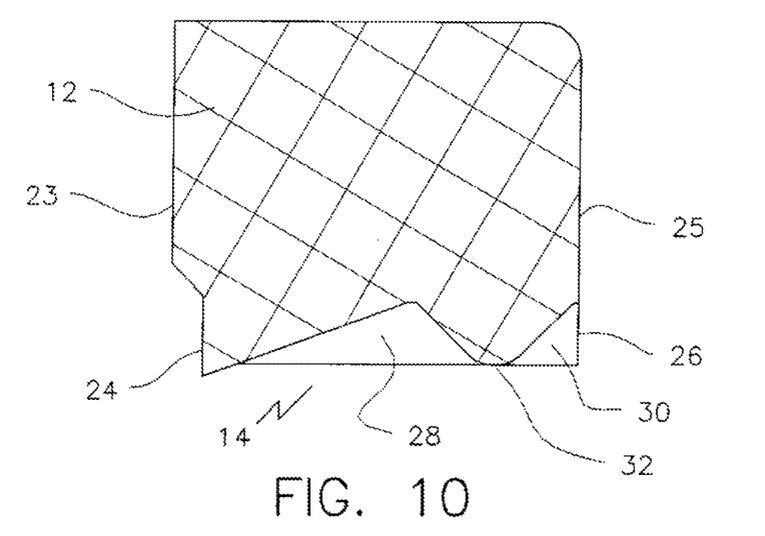

Referring to FIGS. 9 and 10, sealing lips 32 of these shapes may have increased or decreased contact pressure with surface 18 of shaft 20 to form fluid pockets 28 as application and design requires.

Referring to FIG. 4, sealing surface 14 is designed to cause lubricant to migrate from second side edge 25 toward first side edge 23. Lubricant gains access to first side edge 23 by second side edge 25 by entering openings 30 between support ribs 26. Shaft 20 rotating relative to sealing surface 14 causes support ribs 26 to apply a migration force on the second fluid. By doing so, lubricant lubricates surface 18 of shaft 20 and support ribs 26 and sealing lip 24.

Referring to FIGS. 6 and 8, which have discrete fluid pockets 28, vibrations due to imperfections in the dynamic motion of shaft 20 cause fluctuations in pressure in fluid pockets 28. These imperfections may be caused by off-axis rotation, the shaft not having a slightly elliptical cross-section, or from vibrations due to the drive that rotates shaft 20. Similar considerations also cause these fluctuations if housing 22 rotates and shaft 20 is stationary. These pockets 28, when filled with clean lubricant, are essentially incompressible fluid reservoirs that "feed" the hydrodynamic fluid film formed between the sealing tips 24, 32 and support ribs 26 (as well as additional sealing lips 32 when there are two or more sealing lips as shown in FIG. 8), and shaft 20. As shaft 20 compresses pockets 28 through its dynamic run-out, the lubricating oil contained in these pockets experiences an increase in pressure. The higher pressure lubricating oil is forced between the tapered seal lip 24 and shaft 20. This ensures an enhanced momentary fluid film, or a pulse of higher pressure lubricating oil for seal lip 24. As shaft 20 moves away from pockets 28, the pressure in pocket 28 decreases and fluid is drawn in. The fluid drawn into fluid pocket 28 will originate from the direction of the next seal lip 32 because of its shape and interference on shaft 20. Thus, each fluid pocket 28 may be considered a "small pump" that ensures a hydrodynamic fluid film of clean lubricant fluid from second side edge 25 is maintained between primary seal lip 24 and shaft 20.

Alternatives:

As mentioned it will be understood that other designs of sealing lips 24 and 32 may also be used. As an example, FIGS. 9 and 10 show alternate shapes of both primary seal lip 24 and second seal lip 32 for the embodiment depicted in FIG. 5, which may allow seal 10 to achieve better results for particular applications. FIG. 9 shows a variation of the embodiment in FIG. 5 with second lip 32 formed in the shape of an "O"-Ring. This example demonstrates the variation that is possible with the seal configuration. Traditionally, "O"-Ring seals do not perform well in rotary applications due to the distortion of its shape under pressure and the contact pressure resulting against the rotating surface 18 of rotating shaft 20. An "O"-Ring will often be starved of lubrication and the generated heat will result in over heating of both the "O"-Ring and rotating surface. When configured in this manner, however, it may be quite effective in some applications. FIG. 10 is another variation of FIG. 5 with second lip 32 formed in the shape of a "B"-Style seal lip. It is known that this shape of seal lip results in much higher contact pressures between the seal lip 32 and the rotating surface 18 of shaft 20 and may be desirable in some applications. It will be understood that other shapes or combinations of shapes may also be used for a wide range of applications.

Figure 14:
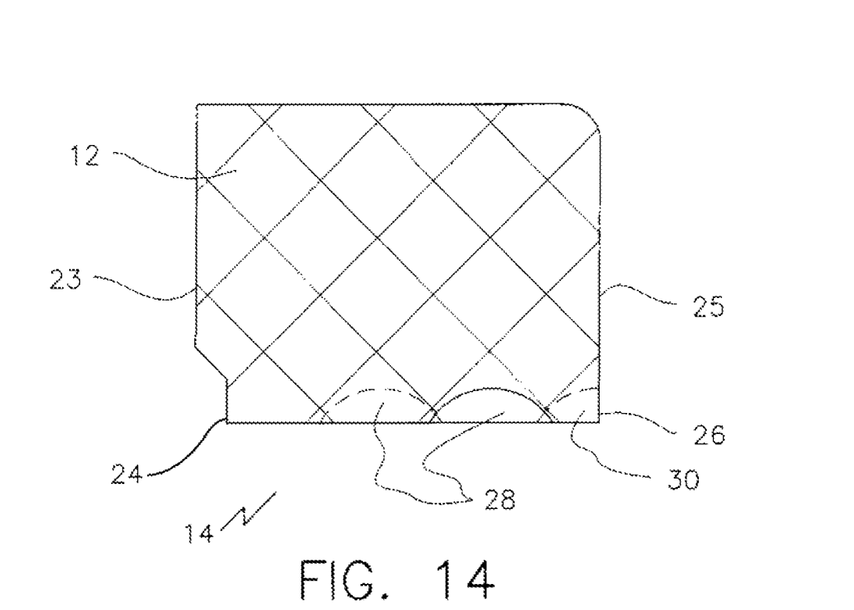
FIG. 14 is side view in section of an alternative fluid pocket design in the sealing surface.
Figure 15:
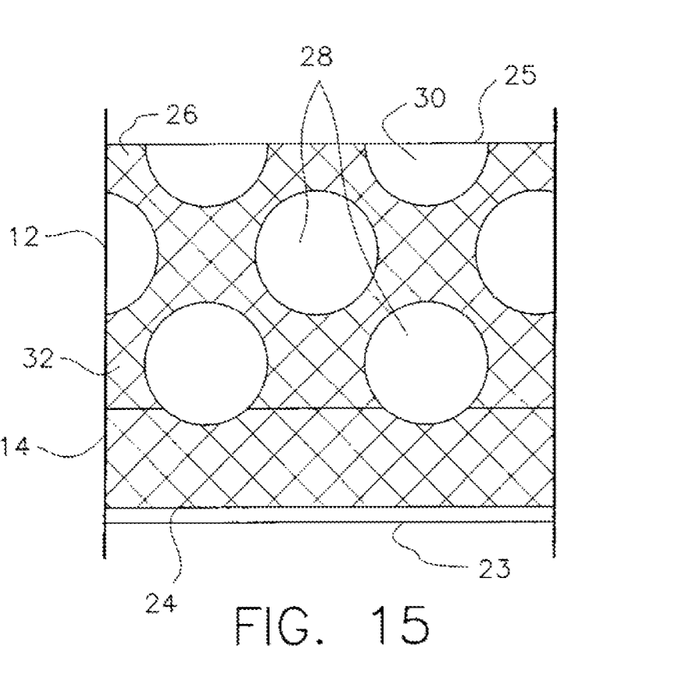
FIG. 15 is a detailed view of the contact surface of the alternative fluid pocket design of the rotary seal as it engages the shaft surface.

Furthermore, while the above description is given in terms of support ribs 26, it will be understood that this is merely one way of implementing the design. For example, the seal footprint, FIGS. 4, 6 and 8, or the portion of the seal that contacts the surface of the shaft, may be described in terms of circumferential components (or seal lips) and axial components (or support ribs), where the axial components need not be perpendicular to the circumferential components, and may not have parallel faces. One example may be a footprint where fluid pockets 28 and/or openings 27 (depending on the embodiment) are formed as round depressions in sealing surface 14. Another example is where secondary sealing lips 32 are not straight, such that pockets 28 are offset from other adjacent pockets 28. Furthermore, instead of considering circumferential and axial components forming the pockets, one may also talk in terms of the pockets being formed out of seal surface. FIG. 14 is another means to achieve fluid pockets adjacent to sealing lip 24 through the use of a "dimple" design, similar to the surface of a golf ball. As can be seen in this embodiment, it is also not necessary to include lip 24, however, lip 24 is desirable in most circumstances. Other designs using these principles will be apparent to those skilled in the art.

Figure 12:
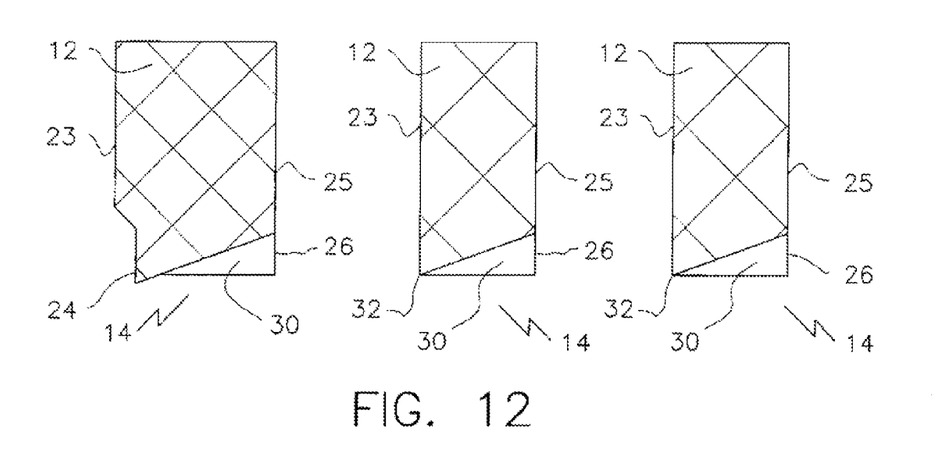
FIG. 12 is a side view in section of a rotary seal built in segmented fashion.
Figure 13:
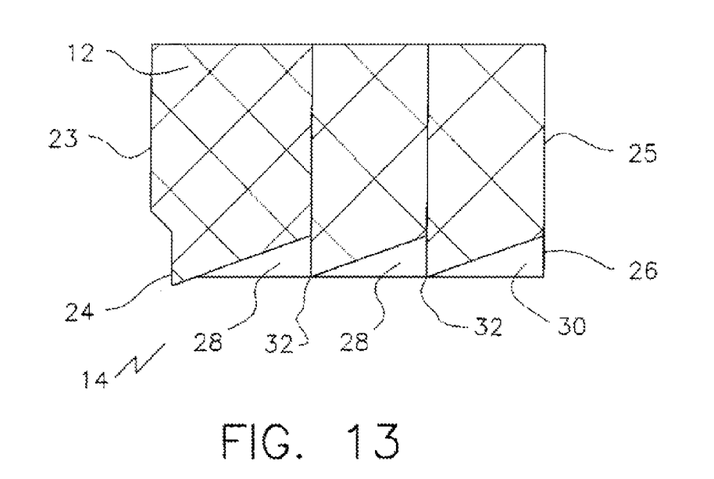
FIG. 13 is a side view in section of a rotary seal built in segmented fashion and installed in a seal housing.

Referring to FIGS. 12 and 13, other advantages may be had by building seal 10 in a segmented fashion and then using seals 10 in a stacked seal arrangement. In this situation, pockets 28 may be formed between primary seal lip 24 of one seal body 12, and openings 30 of another seal body 12 that meet appropriately when subjected to pressure.

Advantages:

Some considerations that are incorporated in this design include: a compressive mounting of the seal onto the shaft, a tapered lip style to create the barrier between the abrasive fluid and the clean lubricating fluid, a displaced seal lip to prevent "nibbling" from the gland, and ensuring a hydrodynamic fluid film between the elastomer seal and rotating shaft for varied pressure conditions.

It is generally a combination of applied pressure and friction that is related to the speed of the rotating shaft that limits the performance of an elastomer seal. To reduce the heat generated, a compressive mounting may be used, where the seal is slightly larger than the shaft, and then compressed onto the rotatable surface 18 through proper sizing of seal groove 16 in housing 22.

In providing a hydrodynamic film, the friction between the seal and the surface of the shaft may be reduced. Referring to the embodiment shown in FIGS. 2, 3 and 4, seal 10 consists of tapered seal lip 24 that is set back from first side edge 23 of sealing surface 14, (seal lip 24 is set back is to prevent "nibbling" from the gland to shaft clearance). Support ribs 26 remain open to the lubricating fluid supplied opposite the fluid to be sealed. Each rib 26 is in contact with shaft 20, (shown in FIG. 11), and provides a constant "wiping" of fluid off shaft 20 as shaft 20 rotates. Advantages to this design are control of the hydrodynamic film through differences in shaft interference of tapered seal lip 24 and ribs 26, as well as the number of ribs 26 provided in each seal 10. As with many seal designs, the performance of this design may be limited by the magnitude of the contained pressure due to the tendency of an elastomer to deform under pressure. However, the rib design offers resistance to this deformation. In addition, fluid pockets 28 such as shown in FIGS. 6 and 8, also provide structural support to resist deformation when filled with incompressible lubricant.

One of the key design features of seal 10 is the provision of a means to trap clean lubricating oil in small pockets 28 behind primary seal lip 24. When axial pressure is applied to seal body 12, the oil trapped in pockets 28 is subjected to same pressure as the elastomer. Because the oil is substantially incompressible, it maintains its presence and provides an amount of lubricant directly to primary seal lip 24. This helps prevent starving the elastomer of a hydrodynamic film as pressures increase. Ribs 26 also tend to support the structure of pockets 28 and provide inlet means 27 for the clean lubricants. Given the benefits of this feature, the performance of seal 10 in different pressure situations will now be discussed with reference to the embodiment shown in FIGS. 5 and 6. Similar considerations may be applied to the other embodiments discussed.

In the high-pressure hydraulic lubricant condition, the pressure of the second fluid, usually the clean lubricant, is greater than the pressure of the abrasive contaminated fluid. In this case, second seal lip 32 and ribs 26 that form pockets 28 on the high-pressure side of primary seal lip 24 serve many purposes:

Second seal lip 32 and ribs 26 provide a hydrodynamic film mechanism for lubrication to prevent heat generation between seal surface 14 and rotatable surface Second seal lip 32 is shaped to allow clean secondary lubricating fluid leakage in a direction towards first seal lip 24 for lubrication of first seal lip 24 and exclusion of the abrasive first fluid.

Fluid pockets 28 of lubricating fluid behind primary seal lip 24 prevent applied axial pressure from deforming seal body 12 to the point that the contact area between seal surface 14 and rotating shaft surface 18 is starved of lubricating oil. As axial pressure, acting on seal body 12 increases, the resulting pressure applied to rotating shaft surface 18 from seal surface 14 increases. The pressure of the clean lubricant trapped in the pockets also increases at the same magnitude and, being virtually incompressible, maintains the structure of the pocket 28 as well as provide a presence of clean lubricating fluid under pressure to lubricate the seal surface 14. This configuration, along with the mechanical "pumping" action of shaft 20, ensures that pockets 28 remain full of lubricating fluid to provide the "pulsed" hydraulic fluid film between primary seal lip 24 and shaft surface 18.

In the balanced hydraulic lubricant condition, the clean hydraulic lubricant fluid pressure is equal to the pressure of the abrasive contaminated fluid. This may be the ideal condition for seal 10. With equal pressure on either side of seal body 12, ribs 26 provide lubricant openings 27 for the hydrodynamic film. This, in combination with the dynamic imperfections of the shaft rotation, acting on fluid pockets 28, may provide the appropriate amount of lubricant to primary seal lip 24 for higher speeds. This is beneficial because reducing the applied pressure on an elastomer seal allows the seal to be used more successfully at higher speeds.

FIG. 1 shows a seal body 12 with an opening and 20 ribs 26. However, the number of ribs may be changed in order to vary the size of sealed pockets 28, and the number of contact points on shaft 20. These are significant variables in application due to the two hydrodynamic mechanisms to be considered. Firstly, the number and shape of ribs 26 will determine the amount of lubricating fluid supplied to the hydrodynamic film. Secondly, the number and size of fluid pockets 28 will directly affect the magnitude of the "pulse" resulting from rotating shaft 20. For example, fewer ribs 26 results in larger fluid pockets 28 with less pulse magnitude from shaft inconsistencies. Conversely, more ribs 28 results in smaller fluid pockets 28 that may prove to be extremely sensitive to shaft dynamics. If each pocket 28 is considered a small "pump", a fluid reservoir could be emptied too quickly with an inappropriate design or application.

In the balanced lubricant condition, some insight into what can be done through the design aspect of seal 10 may be gained. The necessary condition for success is to ensure that primary seal lip 24 is provided with a hydrodynamic film of clean lubricant. In the reverse pressure condition, therefore, the pressure of the clean lubricant fluid must be greater than the pressure of the abrasive contaminated fluid. Pockets 28 of clean lubricant in this design and the dynamic inconsistencies of the shaft rotation provide a mechanism to increase the pressure of the clean lubricating fluid. The magnitude of the pressure increase is influenced by many factors, including specific applications, and requires testing to determine its effectiveness.

In the reverse pressure condition, the clean hydraulic lubricant fluid pressure is less than the pressure of the abrasive contaminated fluid. This condition is the most difficult to accommodate successfully. It should be recognized, however that seal 10 does not have the same inherent problems associated with other designs. With primary seal lip and support ribs, FIG. 2, reverse pressure conditions do not deform seal body 12 to produce pressure pivots or high and low-pressure contact areas in seal surface 14 due to the supporting rib structure. In the sealed pocket design, FIGS. 5 and 7, the fluid filled pressure pockets 28 further resist reverse pressure conditions. Compression of seal body 12 in the reverse pressure condition results in compression of the clean lubricating oil sealed in pockets 28 behind primary seal lip 24. As in the high-pressure lubricant condition, sealed pockets 28 reduce the area of high-pressure contact between the elastomer and rotating shaft 20 by sealed pockets 28 of incompressible lubricant.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A rotary seal for dynamically sealing against a surface of a shaft, the rotary seal comprising:
   an elastomeric seal body having a central axis that is parallel to an axis of the shaft when the seal body seals against the surface of the shaft, the seal body having a sealing surface that is parallel to the central axis and an outer surface opposite the sealing surface and opposed first and second sides that extend between the sealing surface and the outer surface;
   the sealing surface engaging the surface of the shaft such that the shaft is permitted to rotate relative to the sealing surface, at least a portion of the sealing surface having at least one circumferential row of discrete fluid pockets retaining liquid lubricant positioned on the sealing surface, the portion of the sealing surface having the circumferential row of discrete fluid pockets being parallel to the central axis prior to installation on the shaft; and
   a seal housing that encloses the outer surface and the first and second sides of the seal body, and the seal housing constraining the seal body such that axial fluid pressure applied to the seal is also applied to the liquid lubricant retained in the discrete fluid pockets.

2. The rotary seal of claim 1, wherein the sealing surface has a primary sealing lip and a secondary sealing lip, the discrete fluid pockets being positioned between the primary sealing lip and the secondary sealing lip.

3. The rotary seal of claim 1, wherein the sealing surface has more than one secondary sealing lip.

4. The rotary seal of claim 1, wherein the discrete fluid pockets have a substantially rectangular shape.

5. The rotary seal of claim 1, wherein the discrete fluid pockets have a substantially circular shape.

6. The rotary seal of claim 2, wherein at least one of the primary sealing lip and at least one secondary sealing lips protrude inward from the sealing surface, such that the at least one protruding sealing lip is adapted to form a seal against the surface of the shaft with a higher interference than the sealing surface.

7. The rotary seal of claim 1, wherein the sealing surface defines discrete fluid conducting openings at the second side whereby lubricating fluid is supplied to the discrete fluid pockets.

8. The rotary seal of claim 7, wherein the discrete fluid pockets compress and decompress in response to vibrations due to the rotation of the shaft thereby pumping fluid through the discrete fluid conducting openings.

9. A rotary seal for dynamically sealing against a surface of a shaft, the rotary seal comprising:
   an elastomeric seal body having a central axis that is parallel to an axis of the shaft when the seal body seals against the surface of the shaft and a sealing surface that is parallel to the central axis of the shaft and engages the surface of the shaft such that the shaft is permitted to rotate relative to the elastomeric seal body, the seal body further comprising an outer surface opposite the sealing surface and opposed first and second sides that extend between the sealing surface and the outer surface;
   the sealing surface comprising:

a primary sealing lip positioned toward a first side edge of the sealing surface, the primary sealing lip engaging the surface of the shaft for sealing against a first fluid;

at least one secondary sealing lip positioned between the primary seal lip and a second side edge of the sealing surface; and rib supports extending from the sealing lip toward the second side edge of the sealing surface, the rib supports engaging the surface of the shaft, the rib supports forming discrete fluid openings between the at least one secondary sealing lip and the second side edge, and at least one circumferential row of discrete fluid pockets that retain liquid lubricant between the at least one secondary sealing lip and the primary sealing lip, the circumferential row of discrete fluid pockets being parallel to the central axis prior to installation on the shaft; and a seal housing that encloses the outer surface and the first and second sides of the seal body, and the seal housing constraining the seal body such that axial fluid pressure applied to the seal is also applied to the liquid lubricant retained in the discrete fluid pockets.

10. A method of dynamically sealing a surface of a shaft, comprising the steps of:

providing a rotary seal comprising an elastomeric seal body having a central axis that is parallel to an axis of the shaft when the seal body seals against the surface of the shaft and a sealing surface that is parallel to the central axis, the seal body having an outer surface opposite the sealing surface and opposed first and second sides that extend between the sealing surface and the outer surface, the sealing surface having a first side edge and a second side edge, at least a portion of the sealing surface having at least one circumferential row of discrete fluid pockets that retain liquid lubricant positioned between the first side edge and the second side edge, the portion of the sealing surface having the circumferential row of discrete fluid pockets being parallel to the central axis prior to installation on the shaft;

placing the rotary seal within a seal housing such that the seal housing encloses the outer surface and the first and second sides of the elastomeric seal body and such that the seal housing constrains the seal body such that axial fluid pressure applied to the seal is also applied to the liquid lubricant retained in the discrete fluid pockets;

installing the rotary seal on the surface of the shaft such that the sealing surface engages the surface of the shaft such that the shaft is permitted to rotate relative to the sealing surface; and rotating the shaft relative to the sealing surface.

11. The method of claim 10, wherein the rotation of the shaft causes the discrete fluid pockets to compress and decompress, such that the discrete fluid pockets pump fluid from the second side edge toward the first side edge of the sealing surface.

* * * * *